US012165594B2

(12) United States Patent
Lee et al.

(10) Patent No.: US 12,165,594 B2
(45) Date of Patent: Dec. 10, 2024

(54) DRIVE CONTROLLER AND ELECTRONIC DEVICE INCLUDING SAME

(71) Applicant: Samsung Display Co., LTD., Yongin-si (KR)

(72) Inventors: Donggyu Lee, Yongin-si (KR); Hongsoo Kim, Yongin-si (KR); Sehyuk Park, Yongin-si (KR); Youngha Sohn, Yongin-si (KR); Jin-Wook Yang, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/196,659

(22) Filed: May 12, 2023

(65) Prior Publication Data

US 2024/0013724 A1 Jan. 11, 2024

(30) Foreign Application Priority Data

Jul. 6, 2022 (KR) ........................ 10-2022-0083194

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01);
(Continued)

(58) Field of Classification Search
CPC ........... G09G 2330/021; G09G 3/3233; G09G 2300/0819; G09G 3/3266;
(Continued)

(56) References Cited

U.S. PATENT DOCUMENTS 11,423,834 B2 * 8/2022 Park ..................... G09G 3/2096
2018/0137834 A1 * 5/2018 Takiguchi ................ G09G 3/20
(Continued)

FOREIGN PATENT DOCUMENTS

KR 1020220038198 A 3/2022

*Primary Examiner* — Dismery Mercedes
(74) *Attorney, Agent, or Firm* — CANTOR COLBURN LLP

(57) ABSTRACT

An electronic device includes a display panel which includes a plurality of pixels and displays an image at each of multiple frames, a driving circuit which drives the multiple frames at multiple operating frequencies, a voltage generator which provides a voltage to the display panel, and a drive controller. The drive controller includes a representative frequency calculator which calculates a representative frequency, based on operating frequencies of 'n' number of frames before one frame of the multiple frames, and a compensating signal calculator which outputs a compensating signal, based on the representative frequency and a count number in the one frame. The drive controller transmits the compensating signal to the voltage generator, the voltage includes a reference voltage, the voltage generator generates the reference voltage based on the compensating signal, and the voltage generator provides the reference voltage to each of the plurality of pixels.

20 Claims, 13 Drawing Sheets

(52) U.S. Cl.
CPC ............... *G09G 2300/0852* (2013.01); *G09G 2310/0264* (2013.01); *G09G 2310/08* (2013.01); *G09G 2320/0247* (2013.01); *G09G 2330/021* (2013.01); *G09G 2330/028* (2013.01); *G09G 2360/16* (2013.01)

(58) Field of Classification Search
CPC ....... G09G 2320/0247; G09G 2360/16; G09G 3/3225; G09G 3/3696; G09G 2300/0852; G09G 2330/028; G09G 3/3258; G09G 2320/045; G09G 3/3648
See application file for complete search history.

(56) References Cited

U.S. PATENT DOCUMENTS

| | | | | |
|---|---|---|---|---|
| 2018/0288344 | A1* | 10/2018 | Chu | H04N 23/65 |
| 2021/0241699 | A1* | 8/2021 | Lee | G09G 3/3258 |
| 2022/0093048 | A1 | 3/2022 | Lee et al. | |
| 2023/0386390 | A1* | 11/2023 | Park | G09G 3/3233 |
| 2024/0046851 | A1* | 2/2024 | Liu | G09G 3/3648 |

* cited by examiner

FIG. 7

| | FP1 | | FP2 | | FP3 | | FP4 | | FP5 | | FP6 | | FP7 | | FP8 | | FP9 | | | | FP10 | | | | FP11 | | | | FP12 | | | FP13 | | | FP14 | | |
|---|---|---|---|---|---|---|---|---|---|---|---|---|---|---|---|---|---|---|---|---|---|---|---|---|---|---|---|---|---|---|---|---|---|---|---|---|---|
| Sync | | | | | | | | | | | | | | | | | | | | | | | | | | | | | | | | | | | | | |
| CYC | | | | | | | | | | | | | | | | | | | | | | | | | | | | | | | | | | | | | |
| W/H | W | H | W | H | W | H | W | H | W | H | W | H | W | H | W | H | W | H | H | H | W | H | H | H | W | H | H | H | W | H | H | W | H | H | W | H | H |
| Cycle_cnt | 0 | 1 | 0 | 1 | 0 | 1 | 0 | 1 | 0 | 1 | 0 | 1 | 0 | 1 | 0 | 1 | 0 | 1 | 2 | 3 | 0 | 1 | 2 | 3 | 0 | 1 | 2 | 3 | 0 | 1 | 2 | 0 | 1 | 2 | 0 | 1 | 2 |
| DF | | 240 | | 240 | | 240 | | 240 | | 240 | | 240 | | 240 | | 240 | | | | 120 | | | | 120 | | | | 120 | | | 160 | | | 160 | | | 160 |
| SR0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 | 0 | 0 |
| SR1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 | 0 |
| SR2 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 |
| SR3 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 |
| SR4 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 |
| SR5 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 |
| SR6 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 |
| SR7 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 |
| SR8 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 |
| SR9 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 |
| SR10 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 |
| SR11 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 |
| SR12 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 |
| SR13 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 |
| SR14 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 |
| SR15 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 |
| PFI | 195 | 138 | 195 | 138 | 195 | 138 | 195 | 138 | 195 | 138 | 195 | 138 | 195 | 138 | 195 | 138 | 195 | 138 | 95 | 65 | 143 | 101 | 70 | 49 | 132 | 95 | 66 | 46 | 131 | 94 | 65 | 145 | 102 | 72 | 149 | 106 | 73 |
| FI | | | | 138 | | 138 | | 138 | | 138 | | 138 | | 138 | | 138 | | | | 138 | | | | 65 | | | | 49 | | | 46 | | | 65 | | | 72 |

DRIVE CONTROLLER AND ELECTRONIC DEVICE INCLUDING SAME

This application claims priority to Korean Patent Application No. 10-2022-0083194, filed on Jul. 6, 2022, and all the benefits accruing therefrom under 35 U.S.C. § 119, the content of which in its entirety is herein incorporated by reference.

BACKGROUND

1. Field

Embodiments of the disclosure described herein relate to a drive controller improved in display quality and an electronic device including the same.

2. Description of the Related Art

Various multimedia electronic devices, such as a television ("TV"), a cellular phone, a tablet computer, an avigation system, or a game console, are being developed. In particular, since portable electronic devices operate by batteries, various attempts to reduce power consumption are being made.

One of the attempts to reduce the power consumption is to lower an operating frequency of an electronic device. When the operating frequency of the electronic device is lowered under a specific operating environment, such as displaying a still image, the power consumption of the electronic device may be reduced.

In this regard, a technology of reducing the power consumption of the electronic device, while preventing the display quality from being deteriorated, is desired.

SUMMARY

Embodiments of the disclosure provide a drive controller improved in display quality and an electronic device including the same.

In an embodiment of the disclosure, an electronic device includes a display panel including a plurality of pixels and displaying an image at each of a plurality of frames, a driving circuit which drives the plurality of frames at a plurality of operating frequencies, a voltage generator which provides a voltage to the display panel, and a drive controller which controls driving of the driving circuit. The drive controller includes a representative frequency calculator which calculates a representative frequency, based on operating frequencies of 'n' number of frames before one frame of the plurality of frames, where 'n' is an integer greater than 0, and a compensating signal calculator which outputs a compensating signal, based on the representative frequency and a count number in the one frame. The drive controller transmits the compensating signal to the voltage generator, the voltage includes a reference voltage, the voltage generator generates the reference voltage based on the compensating signal, and the voltage generator provides the reference voltage to each of the plurality of pixels.

In an embodiment, the representative frequency may be calculated, based on a synchronization signal for starting each of the plurality of frames, and a counting signal for counting the plurality of frames in a predetermined cycle, and the count number may be output based on the counting signal.

In an embodiment, the synchronization signal may be a vertical synchronization signal.

In an embodiment, the representative frequency calculator may include a plurality of shift registers to receive the synchronization signal and the counting signal, the plurality of shift registers may be electrically connected to each other in series, and one shift register of the plurality of shift registers may transmit an output value to another shift register connected to the one shift register of the plurality of shift registers, when the one shift register receives the counting signal.

In an embodiment, the representative frequency may be calculated by multiplying output values of the plurality of shift registers by mutually different weights from each other.

In an embodiment, the compensating signal calculator may include a look-up table defined based on the representative frequency and the count number.

In an embodiment, a plurality of compensating signals may be provided, and the plurality of compensating signals defined based on the count number at the representative frequency may have at least one different value, when the representative frequency exceeds a predetermined value.

In an embodiment, the compensating signal may have a preset value, when the representative frequency is equal to or less than the predetermined value.

In an embodiment, each of the plurality of pixels may include a first capacitor connected between a first node and a second node, a second capacitor connected between a first voltage line for providing a first driving voltage and the first node, a light-emitting diode including a first electrode and a second electrode connected to a second voltage line for providing a second driving voltage different from the first driving voltage, a first transistor including a first electrode electrically connected to the first voltage line, a second electrode electrically connected to the first electrode of the light-emitting diode, and a gate electrode connected to the second node, and a second transistor including a first electrode connected to a data line, a second electrode electrically connected to the first node, and a gate electrode which receives a scan signal.

In an embodiment, the reference voltage may be provided to the first electrode of the first transistor.

In an embodiment, the voltage may include an initialization voltage, the voltage generator may generate the initialization voltage based on the compensating signal, and the initialization voltage may be provided to the first electrode of the light-emitting diode.

In an embodiment, the electronic device may further include a third transistor including a first electrode connected to the first voltage line, a second electrode electrically connected to the first electrode of the first transistor, and a gate electrode to receive a light-emitting signal.

In an embodiment, the counting signal may be defined based on the light-emitting signal.

In an embodiment, the synchronization signal may be defined based on the scan signal.

In an embodiment of the disclosure, an electronic device includes a display panel including a plurality of pixels which display an image at each of a plurality of frames, a driving circuit which drives the plurality of frames at a plurality of operating frequencies, and a drive controller which controls driving of the driving circuit. The drive controller includes a representative frequency calculator which calculates a representative frequency, based on at least one operating frequency of at least one frame before one frame of the plurality of frames, and a compensating signal calculator which outputs a compensating signal, based on the representative frequency and an operating frequency in the at least one frame, the drive controller transmits the compensating signal to the driving circuit, the driving circuit generates a light-emitting signal based on the compensating signal, and the driving circuit provides the light-emitting signal to each of the plurality of pixels.

In an embodiment, the representative frequency may be calculated, based on a synchronization signal for starting each of the plurality of frames, and a counting signal for counting a cycle of each of the plurality of frames.

In an embodiment, the representative frequency calculator may include a plurality of shift registers which receive the synchronization signal and the counting signal, the plurality of shift registers may be electrically connected to each other in series, and one shift register of the plurality of shift registers may transmit an output value to another shift register connected to the one shift register of the plurality of shift registers, when the one shift register receives the counting signal.

In an embodiment, the representative frequency may be calculated by multiplying output values of the plurality of shift registers by mutually different weights from each other.

In an embodiment, the compensating signal calculator may include a look-up table defined based on the representative frequency and the count number.

In an embodiment, a drive controller may include a representative frequency calculator, and a compensating signal calculator, the drive controller may receive an image signal provided at each of a plurality of frames driven at an operating frequency, the representative frequency calculator may output a representative frequency based on operating frequencies of 'n' number of frames before one frame of the plurality of frames, where n is an integer greater than 0, and the compensating signal calculator may output a compensating signal, based on the representative frequency and a count number in the one frame.

BRIEF DESCRIPTION OF THE DRAWINGS

The above and other embodiments, advantages and features of the disclosure will become apparent by describing in detail embodiments thereof with reference to the accompanying drawings.

FIG. 7 is a view illustrating an embodiment of an operation of a representative frequency calculator according to the disclosure.

DETAILED DESCRIPTION

Figure 1:
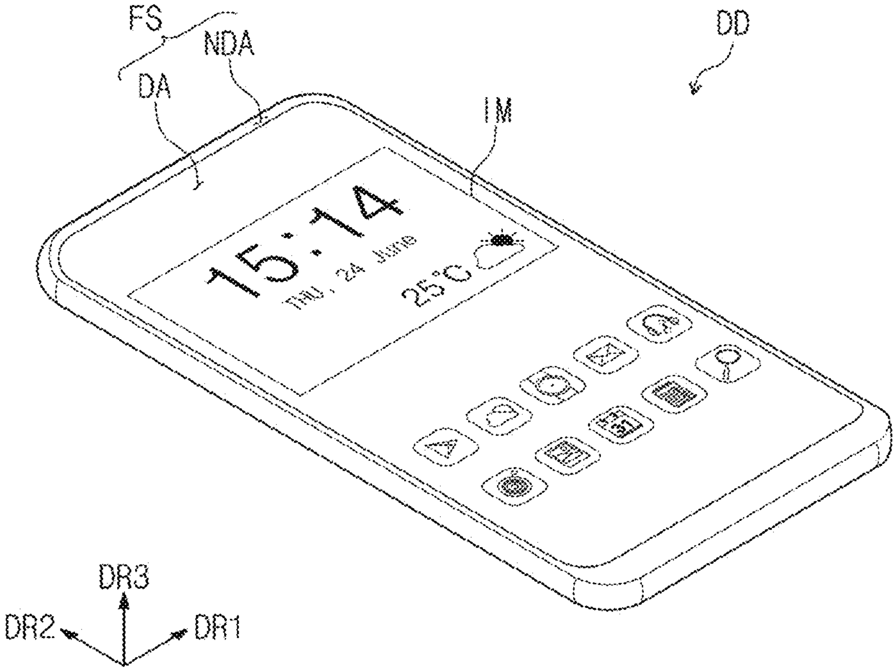
FIG. 1 is a perspective view of an embodiment of an electronic device, according to the disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

The term such as "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a perspective view of an embodiment of an electronic device according to the disclosure.

Referring to FIG. 1, in an embodiment of the disclosure, an electronic device DD may have a shape having a shorter side extending in a first direction DR1 and a longer side extending in a second direction DR2 crossing the first direction DR1. However, the shape of the electronic device DD is not limited thereto, but various electronic devices DD having various shapes may be provided.

According to the disclosure, the electronic device DD may include a large-size display device, such as a television or a monitor, or a small-size or medium-size display device, such as a cellular phone, a tablet, a vehicle navigation, or a game console. The above examples are provided only for the illustrative purpose, and it is obvious that the electronic device DD may be applied to any other electronic device(s) without departing from the scope of the disclosure.

As illustrated in FIG. 1, the electronic device DD may display an image IM, in a third direction DR3 crossing a plane defined by the first direction DR1 and the second direction DR2, on a display surface FS parallel to the first direction DR1 and the second direction DR2, respectively. The display surface FS to display the image IM may correspond to a front surface of the electronic device DD.

The display surface FS of the electronic device DD may be divided into a plurality of regions. The display surface FS of the electronic device DD may be divided into a display region DA and a non-display region NDA.

The display region DA may be a region in which the image IM is displayed. The user may view the image IM through the display region DA. The shape of the display region DA may actually be defined by the non-display region NDA. However, the above structure is provided for the illustrative purpose. In an embodiment, the non-display region NDA may be adjacent to only one side of the display region DA or may be omitted, for example. The electronic device DD in an embodiment of the disclosure may include various embodiments, and the disclosure is not limited to any embodiment.

The non-display region NDA, which is a region adjacent to the display region DA, may be a region in which the image IM is not displayed. A bezel region of the electronic device DD may be defined by the non-display region NDA.

The non-display region NDA may surround the display region DA. However, the structure is provided for the illustrative purpose. In an embodiment, the non-display region NDA may be adjacent to only a portion of an edge of the display region DA, for example, and not limited to any particular embodiment.

Figure 2:
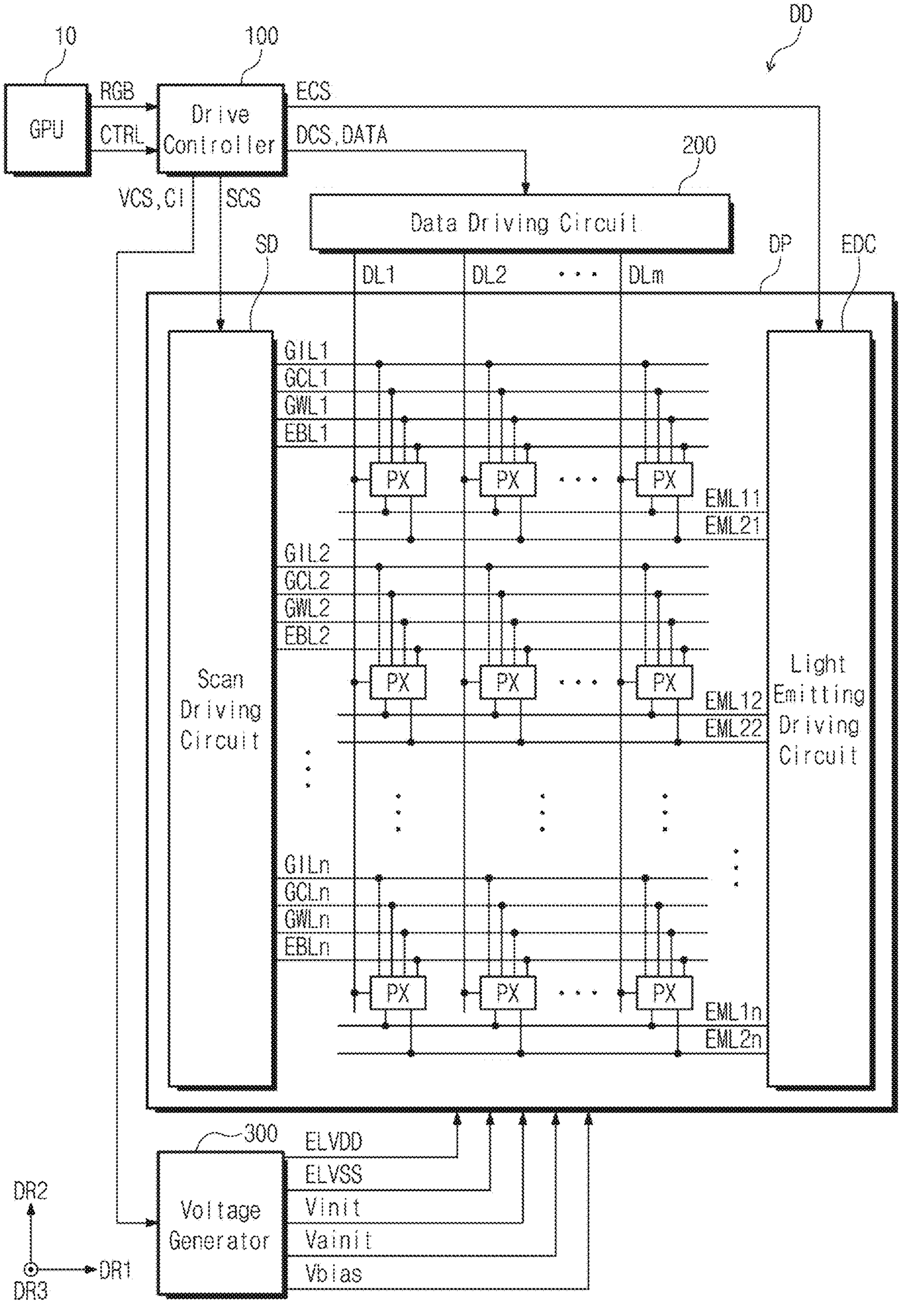
FIG. 2 is a block diagram of an embodiment of an electronic device according to the disclosure.

FIG. 2 is a block diagram of an embodiment of an electronic device, according to the disclosure.

Referring to FIG. 2, the electronic device DD includes a host processor a display panel DP, a drive controller 100, a data driving circuit 200, and a voltage generator 300.

In an embodiment of the disclosure, the host processor 10 may be a graphic processing unit ("GPU"). The host processor 10 may provide an image signal RGB and a control signal CTRL to the drive controller 100. The host processor 10 may control the displaying operation of the display panel DP through the image signal RGB and the control signal CTRL.

The display panel DP in an embodiment of the disclosure may be a light-emitting display panel, but is not particularly limited thereto. In an embodiment, the display panel DP may be an organic light-emitting display panel, a quantum dot light-emitting display panel, a micro-light-emitting diode ("micro-LED") display panel, or a nano-LED display panel, for example. The light-emitting layer of the organic light-emitting display layer may include an organic light-emitting material. The light-emitting layer of the quantum dot light-emitting display panel may include a quantum dot, or a quantum rod, or the like. A light-emitting layer of the micro-LED display panel may include a micro-LED. A light-emitting layer of the nano-LED display layer may include a nano-LED.

The drive controller 100 receives the image signal RGB and the control signal CTRL. The drive controller 100 generates an image data signal DATA by transforming a data format of the image signal RGB to be matched to the interface specification of the data driving circuit 200. The drive controller 100 may output a scan control signal SCS, a data control signal DCS, a light-emitting control signal ECS, a voltage control signal VCS, and a compensating signal CI.

The data driving circuit 200 receives the data control signal DCS and the image data signal DATA from the drive controller 100. The data driving circuit 200 may transform the image data signal DATA into a data voltage Vdata (refer to FIG. 3), and the data voltage Vdata (refer to FIG. 3) may be output to a plurality of data lines DL1 to DLm, respectively. Here, m is a natural number. The data voltage Vdata (refer to FIG. 3) may be an analog voltage corresponding to a grayscale value of the image data signal DATA.

In an embodiment of the disclosure, the data driving circuit 200 may output the data voltage Vdata (refer to FIG. 3) corresponding to the image data signal DATA to the data lines DL1 to DLm for the driving duration "A" (refer to FIG. 4A) of one frame.

The voltage generator 300 may receive the voltage control signal VCS and the compensating signal CI from the drive controller 100. The voltage generator 300 generates voltages desired for an operation of the display panel DP based on the voltage control signal VCS and the compensating signal CI. The voltage generator 300 may provide the voltage to the display panel DP. In an embodiment of the disclosure, the voltage may include a first driving voltage ELVDD, a second driving voltage ELVSS, a first initialization voltage Vinit, a second initialization voltage Vainit, and a reference voltage Vbias.

The first initialization voltage Vinit may have a voltage level higher than that of the second initialization voltage Vainit. However, the above voltage levels are provided only for the illustrative purpose, and the voltage levels of the first initialization voltage Vinit and the second initialization voltage Vainit are not limited thereto. In an embodiment, the first initialization voltage Vinit and the second initialization voltage Vainit may have an identical voltage level, for example.

The display panel DP includes scan lines GIL1 to GILn, GCL1 to GCLn, and GWL1 to GWLn, light-emitting control lines EML11 to EML**1*n* and EML21 to EML2*n*, data lines DL1** to DLm, and pixels PX. Here, n is a natural number. The display panel DP may further include a scan driving circuit SD and a light-emitting driving circuit EDC.

The scan driving circuit SD may be arranged at a first side (e.g., left side in FIG. 2) of the display panel DP. The scan lines GIL1 to GILn, GCL1 to GCLn, and GWL1 to GWLn extend in the first direction DR1 from the scan driving circuit SD.

The light-emitting driving circuit EDC may be disposed at a second side (e.g., right side in FIG. 2) of the display panel DP. The light-emitting control lines EML11 to EML1*n* and EML21 to EML2*n* extend in a direction opposite to the first direction DR1 from the light-emitting driving circuit EDC.

The scan lines GIL1 to GILn, GCL1 to GCLn, and GWL1 to GWLn and the light-emitting control lines EML11 to EML1*n* and EML21 to EML2*n* are arranged to be spaced from each other in the second direction DR2.

The data lines DL1 to DLm extend in a direction opposite to the second direction DR2 from the data driving circuit 200. The data lines DL1 to DLm may be arranged while being spaced apart from each other in the first direction DR1.

In an embodiment illustrated in FIG. 2, the scan driving circuit SD and the light-emitting driving circuit EDC are arranged to face each other while the pixels PX are interposed between the scan driving circuit SD and the light-emitting driving circuit EDC. However, the disclosure is not limited thereto. In an embodiment, the scan driving circuit SD and the light-emitting driving circuit EDC may be disposed adjacent to each other on one of the first side and the second side of the display panel DP, for example. In an embodiment, the scan driving circuit SD and the light-emitting driving circuit EDC may be integrally implemented into one circuit.

The plurality of pixels PX is electrically connected to the scan lines GIL1 to GILn, GCL1 to GCLn, GWL1 to GWLn, and EBL1 to EBLn, the light-emitting control lines EML11 to EML1*n* and EML21 to EML2*n*, and the data lines DL1 to DLm. In an embodiment, each of the plurality of pixels PX may be electrically connected to four scan lines and two light-emitting control line. However, in an embodiment of the disclosure, the above number of lines connected to the pixels PX is provided only for the illustrative purpose, and is not limited thereto.

The scan lines GIL1 to GILn, GCL1 to GCLn, GWL1 to GWLn, and EBL1 to EBLn may include the initialization scan lines GIL1 to GILn, the compensating scan lines GCL1 to GCLn, the scan signal lines GWL1 to GWLn, and the light-emitting initialization signal lines EBL1 to EBLn.

The light-emitting control lines EML11 to EML1*n* and EML21 to EML2*n* may include the first light-emitting control lines EML11 to EML1*n* and the second light-emitting control lines EML21 to EML2*n*.

Figure 3:
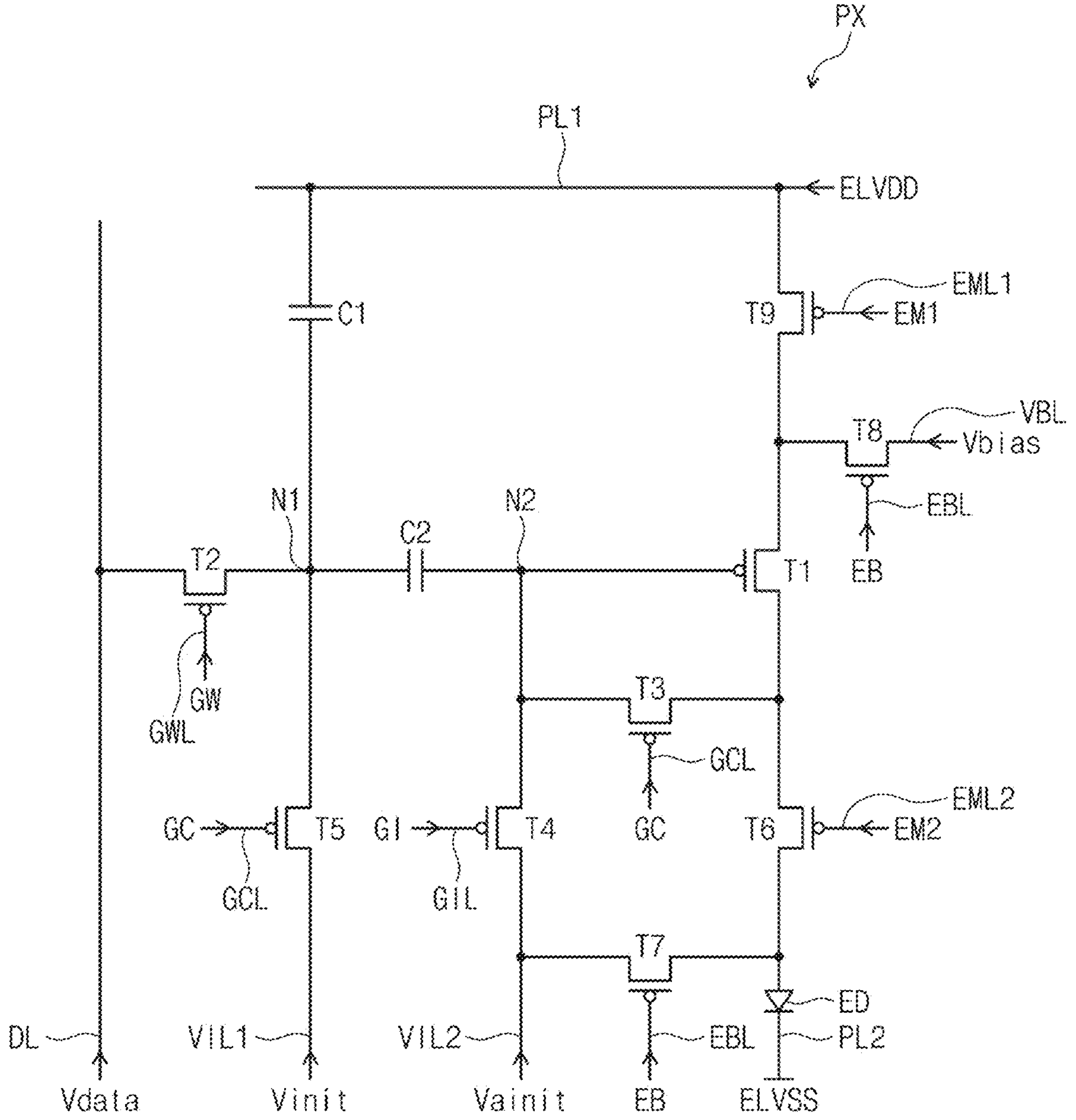
FIG. 3 is an equivalent circuit diagram of an embodiment of a pixel according to the disclosure.

Each of the pixels PX includes a light-emitting diode ED (refer to FIG. 3) and a pixel circuit unit to control a light-emitting operation of the light-emitting diode ED (refer to FIG. 3).

The light-emitting diode ED (refer to FIG. 3) of each of the pixels PX may generate light having mutually different colors. In an embodiment, the pixels PX may include red pixels to produce red color light, green pixels to produce green color light, and blue pixels to produce blue color light, for example. A light-emitting diode of a red pixel, a light-emitting diode of a green pixel, and a light-emitting diode of a blue pixel may include light-emitting layers including mutually different materials.

The pixel circuit unit may include at least one transistor and at least one capacitor. This will be described later. The scan driving circuit SD and the light-emitting driving circuit EDC may include transistors formed through the same process as processes for transistors included in the pixel circuit.

Each of the plurality of pixels PX receives the first driving voltage ELVDD, the second driving voltage ELVSS, the first initialization voltage Vinit, and the second initialization voltage Vainit from the voltage generator 300.

The scan driving circuit SD receives the scan control signal SCS from the drive controller 100. The scan driving circuit SD may output scan signals to the scan lines GIL1 to GILn, GCL1 to GCLn, and GWL1 to GWLn, in response to the scan control signal SCS.

The light-emitting driving circuit EDC may output the light-emitting signals to the light-emitting control lines EML11 to EMLn and EML21 to EML2*n*, in response to the light-emitting control signal ECS.

In an embodiment of the disclosure, the drive controller 100 may determine the operating frequency, and may control the data driving circuit 200, the scan driving circuit SD, and the light-emitting driving circuit EDC, depending on the determined operating frequency.

FIG. 3 is an equivalent circuit diagram of an embodiment of a pixel, according to the disclosure. In the following description made with reference to FIG. 3, the same components as the components described with reference to FIG. 2 will be assigned with the same reference numerals, and the details thereof will be omitted to avoid redundancy.

Referring to FIG. 3, the pixel PX may include first to ninth transistors T1, T2, T3, T4, T5, T6, T7, T8, and T9, capacitors C1 and C2, and the light-emitting diode ED. In an embodiment of the disclosure, the pixel PX may be also referred to as having a 9T2C structure. However, the above structure is provided only for the illustrative purpose. The structure of the pixel PX in an embodiment of the disclosure is not limited thereto, and may be variously provided. In an embodiment, the pixel PX may have a 10T2C structure, for example.

Each of the first to ninth transistors T1 to T9 may be a P-type thin film transistor having a low-temperature polycrystalline silicon ("LTPS") semiconductor layer. However, the above structure is provided only for the illustrative purpose. In an embodiment of the disclosure, at least one of the first to ninth transistors T1 to T9 is a P-type transistor, and remaining transistors of the first to ninth transistors T1 to T9 may be N-type transistors including a semiconductor layer including an oxide semiconductor.

The scan lines GIL, GCL, GWL, and EBL may transmit scan signals GI, GC, GW, and EB, respectively. The scan lines GIL, GCL, GWL, and EBL may include the initialization scan line GIL, the compensating scan line GCL, the scan signal line GWL, and the light-emitting initialization signal line EBL. The initialization scan line GIL may be one of the initialization scan lines GIL1 to GILn (refer to FIG. 2). The compensating scan line GCL may be one of the compensating scan lines GCL1 to GCLn (refer to FIG. 2). The scan signal line GWL may be one of scan signal lines GWL1 to GWLn (refer to FIG. 2). The light-emitting initialization signal line EBL may be one of the light-emitting initialization signal lines EBL1 to EBLn (refer to FIG. 2).

The light-emitting control lines EML1 and EML2 may transmit light-emitting signals EM1 and EM2. The light-emitting control lines EML1 and EML2 may include the first light-emitting control line EML1 and the second light-emitting control line EML2. The first light-emitting control line EML1 may be one of the first light-emitting control lines EML11 to EML1*n* (refer to FIG. 2). The second light-emitting control line EML2 may be one of the second light-emitting control lines EML21 to EML2*n* (refer to FIG. 2).

The data line DL may transmit the data voltage Vdata. The data voltage Vdata may have a voltage level corresponding to the image signal RGB input to the electronic device DD (refer to FIG. 1). A first voltage line PL1 may transmit the first driving voltage ELVDD. A second voltage line PL2 may transmit the second driving voltage ELVSS. The first driving voltage ELVDD may have a voltage level higher than that of the second driving voltage ELVSS. A first initialization voltage line VIL1 may transmit the first initialization voltage Vinit. A second initialization voltage line VIL2 may transmit the second initialization voltage Vainit. A reference voltage line VBL may transmit the reference voltage Vbias.

The first capacitor C1 may be connected between the first voltage line PL1 and a first node N1.

The second capacitor C2 may be connected between the first node N1 and a second node N2.

The light-emitting diode ED may include a first electrode electrically connected to the first voltage line PL1 through the first transistor T1, the sixth transistor T6, and the ninth transistor T9 and a second electrode connected to the second voltage line PL2. The first electrode of the light-emitting diode ED may be also referred to as an anode electrode.

The first transistor T1 includes a first electrode electrically connected to the first voltage line PL1 through the ninth transistor T9, a second electrode electrically connected to the first electrode of the light-emitting diode ED through the sixth transistor T6, and a gate electrode connected to the second node N2. The first transistor T1 may be also referred to as a driving transistor.

The second transistor T2 may include a first electrode connected to the data line DL, a second electrode electrically connected to the first node N1, and a gate electrode to receive the first scan signal GW. The second transistor T2 may be also referred to as a switching transistor.

The third transistor T3 may include a first electrode connected to the second node N2, a second electrode electrically connected to a second electrode of the first transistor T1, and a gate electrode to receive the compensating scan signal GC.

The fourth transistor T4 may include a first electrode electrically connected to the second node N2, a second electrode connected to the second initialization voltage line VIL2, and a gate electrode receiving the initialization scan signal GI.

The fifth transistor T5 may include a first electrode connected to the first node N1, a second electrode electrically connected to the first initialization voltage line VIL1, and a gate electrode to receive the compensating scan signal GC.

The sixth transistor T6 may include a first electrode connected to the second electrode of the first transistor T1, a second electrode connected to the first electrode of the light-emitting diode ED, and a gate electrode to receive the second light-emitting signal EM2.

The seventh transistor T7 may include a first electrode connected to the second initialization voltage line VIL2, a second electrode connected to the first electrode of the light-emitting diode ED and the second electrode of the sixth transistor T6, and a gate electrode to receive the second scan signal EB. The second initialization voltage Vainit provided from the second initialization voltage line VIL2 may have a voltage level lower than that of the first initialization voltage Vinit.

The eighth transistor T8 may include a first electrode connected to the first electrode of the first transistor T1 and the second electrode of the ninth transistor T9, a second electrode connected to the reference voltage line VBL, and a gate electrode to receive the second scan signal EB.

Unlike the disclosure, the driving current of the first transistor T1, which is derived from the data voltage Vdata applied at a current frame, may be affected by a data voltage Vdata applied at a previous frame, based on the hysteresis characteristic of the first transistor T1. However, according to the disclosure, as the reference voltage Vbias is applied to the first electrode of the first transistor T1 through the eighth transistor T8, the brightness difference caused by the hysteresis of the first transistor T1 may be controlled. Accordingly, the flickering phenomenon may be controlled when displaying the image IM on the electronic device DD. Accordingly, the electronic device DD (refer to FIG. 1) improved in display quality may be provided.

The ninth transistor T9 includes a first electrode connected with the first voltage line PL1, a second electrode connected with the first electrode of the first transistor T1, and a gate electrode (also referred to as third electrode) to receive the first light-emitting control signal EM1.

Figure 4A:
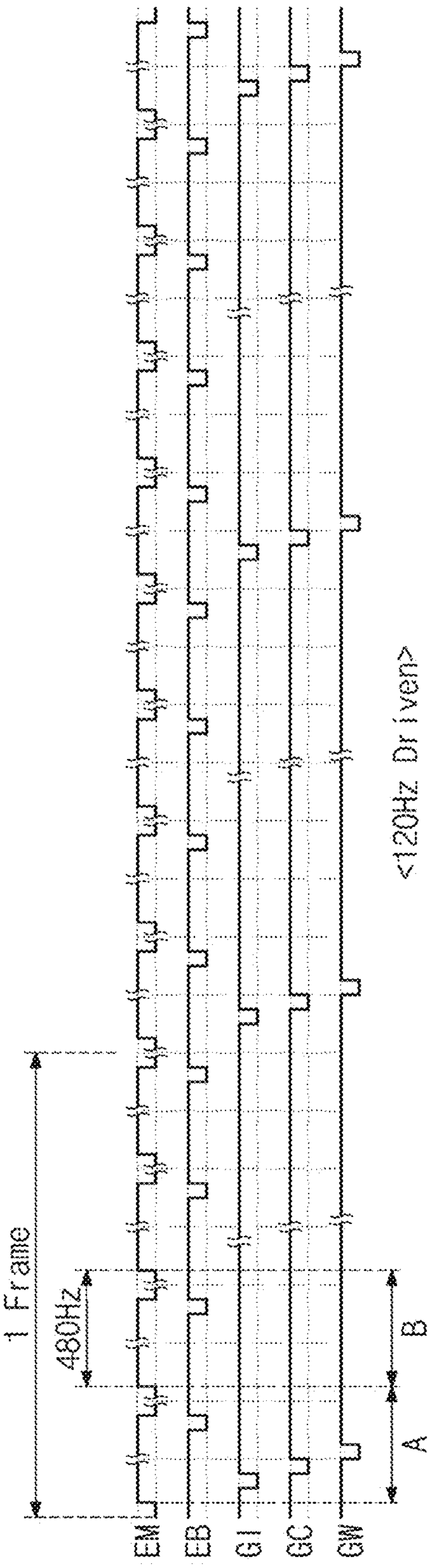
FIGS. 4A and 4B are waveform diagrams of an embodiment of a driving signal for driving a pixel according to the disclosure.
Figure 4B:
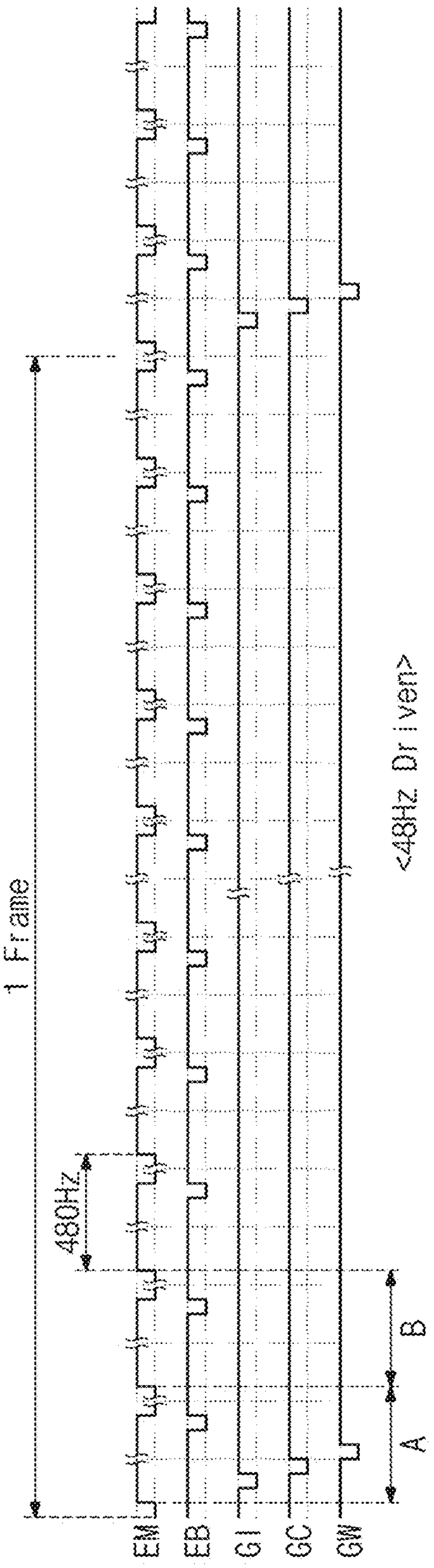

FIGS. 4A and 4B are waveform diagrams of an embodiment of a driving signal for driving a pixel, according to the disclosure. FIG. 4A illustrates that the pixel is driven at the operating frequency of about 120 Hertz (Hz), and FIG. 4B illustrates that the pixel is driven at the operating frequency of about 48 Hz.

Referring to FIGS. 2 to 4B, the drive controller 100 may support a variable frequency mode. The host processor 10 may provide the image signal RGB to the drive controller 100 at a variable frame rate for each frame. The drive controller 100 supporting the variable frequency mode may provide the image data signal DATA to the data driving circuit 200 in synchronization with the variable frame rate, thereby controlling the image IM (refer to FIG. 1) to be displayed at the variable frame rate.

The scan driving circuit SD may drive a plurality of frames at a plurality of operating frequencies, respectively. In the plurality of pixels PX, scan signals GI, GC, GW, and EB output from the scan driving circuit SD are input, and thus the light-emitting diode ED emits light in response to the scan signals GI, GC, GW, and EB. In this case, a frequency, at which the image data signal DATA is input, may be also referred to as an operating frequency.

The display panel DP may display the image IM (refer to FIG. 1) for each frame duration. One frame (frame 1) duration may include a driving duration "A" and at least one scan duration "B". Each of the driving duration "A" and the scan duration "B" may be a duration having a time of about 2.1 milliseconds (ms). In other words, each of the driving duration "A" and the scan duration "B" may have a frequency of about 480 Hz. However, the time is provided only for the illustrative purpose, and the time of each of the driving duration "A" and the scan duration "B" is not limited thereto. In an embodiment, each of the driving duration "A" and the scan duration "B" may be the duration having a time of about 4.2 ms, for example.

For the driving duration "A", each of the scan signal lines GWL1 to GWLn, the compensating scan lines GCL1 to GCLn, the initialization scan lines GILL to GILn, the light-emitting control lines EML1 to EMLn, and the light-emitting initialization signal lines EBL1 to EBLn may be sequentially scanned.

Each of the scan signals GI, GC, GW, and EB and the light-emitting signal EM may have a high level for some durations and a low level for some durations. In this case, the P-type transistors are turned on when the relevant signal has a low level. Hereinafter, in an embodiment of the disclosure, the first to ninth transistors T1 to T9 included in the pixel PX will be described as P-type transistors. The high-level duration of the light-emitting signal EM may be also referred to as a non-emission duration, and the low-level duration of the light-emitting signal EM may be also referred to as an emission duration.

The light-emitting signal EM may be one of the first light-emitting signal EM1 (refer to FIG. 3) and the second light-emitting signal EM2 (refer to FIG. 3).

Referring to FIG. 4A, when the host processor 10 generates a frame having a scanning rate of about 120 Hz, the scan driving circuit SD and the light-emitting driving circuit EDC may perform a control operation such that one frame has one driving duration "A" and three scan durations "B". Accordingly, the light-emitting driving circuit EDC may operate the display panel DP at the operating frequency of about 120 Hz.

Referring to FIG. 4B, when the host processor 10 generates a frame having a scanning rate of about 48 Hz, the scan driving circuit SD and the light-emitting driving circuit EDC may perform a control operation such that one frame has one driving duration "A" and nine scan durations "B". Accordingly, the light-emitting driving circuit EDC may operate the display panel DP at the operating frequency of about 48 Hz.

However, the above operation of the display panel DP is provided only for the illustrative purpose. The operation of the display panel DP is not limited thereto. In an embodiment, when the host processor 10 generates a frame having the scanning rate of about 240 Hz, the scan driving circuit SD may perform a control operation such that one frame has one driving duration "A" and one scan duration "B", and thus allows the display panel DP to operate at the frequency of about 240 Hz, for example.

According to the disclosure, the electronic device DD may synchronize a timing of generating a frame in the host processor 10 with a timing of outputting a frame in the display panel DP. The electronic device DD may adjust the operating frequency of the display panel DP by repeating the scan duration "B". In other words, the number of scan durations "B" may vary depending on the operating frequency. The display panel DP may operate at a variable frequency. In this case, the display panel DP may be also referred to as operating in a variable frequency mode. In an embodiment, when the operating frequency of the electronic device DD is lowered under a predetermined operating environment, such as displaying a still image, the power consumption of the electronic device may be reduced, for example. Accordingly, the electronic device DD having reduced power consumption may be provided.

Figure 5:
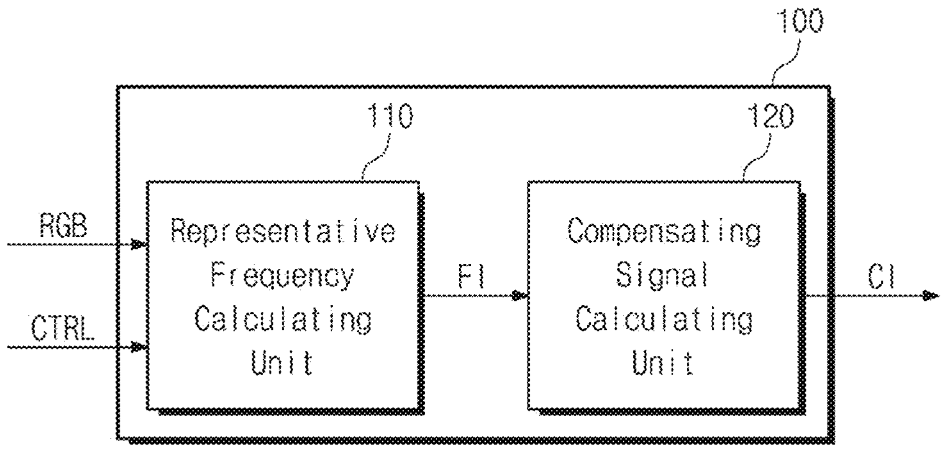
FIG. 5 is a block diagram illustrating an embodiment of a drive controller according to the disclosure.

FIG. 5 is a block diagram illustrating an embodiment of a drive controller according to the disclosure.

Referring to FIGS. 2 and 5, the drive controller 100 may include a representative frequency calculator 110 and a compensating signal calculator 120. The drive controller 100 may receive the image signal RGB from the host processor 10.

The representative frequency calculator 110 may output a representative frequency FI based on operating frequencies of 'm' number of frames before one of a plurality of frames. And 'm' is an integer greater than 0.

The compensating signal calculator 120 may output the compensating signal CI, based on the representative frequency FI and a count number in one frame. The count number may refer to the number of times that the signal is repeated in a predetermined cycle within the one frame.

According to the disclosure, the compensating signal CI may be calculated based on operating frequencies of 'm' number of frames before one of a plurality of frames. In other words, the compensating signal calculator 120 may output the compensating signal CI by considering the influence of the accumulated variable operating frequencies. The voltage generator 300 may provide a voltage to the display panel DP based on the compensating signal CI. The display panel DP may drive the plurality of pixels PX based on the voltage in which the influence of the accumulated variable operating frequencies is reflected. The electronic device DD may improve the brightness difference of the display panel DP. In addition, the electronic device DD improved in display quality may be provided.

Figure 6:
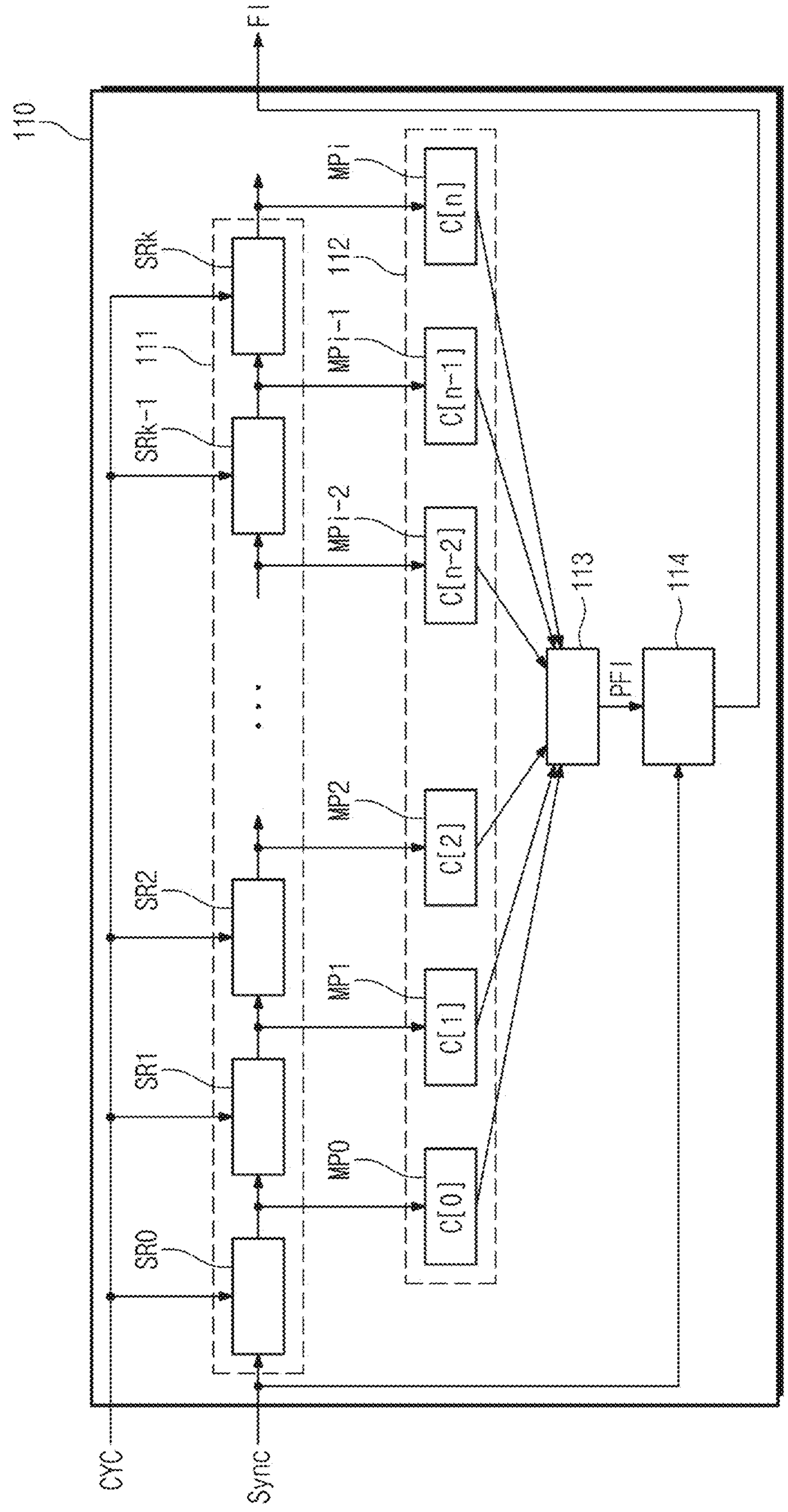
FIG. 6 is a block diagram illustrating an embodiment of a representative frequency calculator according to the disclosure.

FIG. 6 is a block diagram illustrating an embodiment of a representative frequency calculator, according to the disclosure.

Referring to FIGS. 5 and 6, the control signal CTRL may include a synchronization signal Sync and a counting signal CYC. The synchronization signal Sync and the counting signal CYC may be provided to the representative frequency calculator 110. The representative frequency FI may be calculated based on the synchronization signal Sync and the counting signal CYC.

The synchronization signal Sync may be activated at a starting time point of each frame to indicate the starting point of each frame. The synchronization signal Sync may include a vertical synchronization signal. The drive controller 100 (refer to FIG. 5) in an embodiment of the disclosure may operate by receiving, as the synchronization signal Sync, a scan signal GW (refer to FIG. 4A), instead of the vertical synchronization signal, but the disclosure is not limited thereto.

The counting signal CYC may be provided in a predetermined cycle within one frame. The drive controller 100 (refer to FIG. 5) in an embodiment of the disclosure may operate by receiving the light-emitting signal EM (refer to FIG. 4A) instead of the counting signal CYC, but the disclosure is not limited thereto.

The representative frequency calculator 110 may include a shift register unit 111, a weight calculator 112, a frequency calculator 113, and a representative frequency outputting unit 114.

The shift register unit 111 may receive the synchronization signal Sync and the counting signal CYC. The shift register unit 111 may include first to k-th shift registers SR0 to SRk. In this case, k may be 128. However, the above number of shift registers is provided only for the illustrative purpose. The number of the first to k-th shift registers SR0 to SRk in an embodiment of the disclosure is not limited thereto. In an embodiment, k may be 16, for example.

The shift register unit 111 may include shift registers electrically connected to each other in series. In an embodiment, the first shift register SR0 may be connected to the second shift register SR1, and the second shift register SR1 may be connected to the third shift register SR2, for example.

When one shift register in the shift register unit 111 receives the counting signal CYC, the one shift register may transmit an output value to another shift register connected to the one shift register. In an embodiment, the synchronization signal Sync having a value of '1' may be provided to the first shift register SR0 such that the value of '1' may be stored in the first shift register SR0, for example. Thereafter, when the counting signal CYC is provided to the first shift register SR0, the first shift register SR0 may transmit the stored value of '1' to the second shift register SR1.

The weight calculator 112 may be connected to the shift register unit 111. The weight calculator 112 may include first to i-th weight multipliers MP0 to MPi. The number of weight calculators 112 may be provided to correspond to the number of shift register units 111.

The first weight multiplier MP0 may output a first calculation value by multiplying a value output from the first shift register SR0 with a first frequency weight coefficient C[0].

The second weight multiplier MP1 may output a second calculation value by multiplying a value output from the second shift register SR1 with a second frequency weight coefficient C[1].

The third weight multiplier MP2 may output a third calculation value by multiplying a value output from the third shift register SR2 with a third frequency weight coefficient C[2].

The weight calculator 112 may provide calculation values, which are obtained by multiplying values output from the shift register unit 111 by mutually different weights, respectively, to the frequency calculator 113.

The frequency calculator 113 may be connected to the weight calculator 112. The frequency calculator 113 may output an output frequency PFI by adding up the calculated values.

The representative frequency outputting unit 114 may be connected to the frequency calculator 113. The representative frequency outputting unit 114 may output the representative frequency FI, based on the output frequency PFI and the synchronization signal Sync. The representative frequency outputting unit 114 may output, as the representative frequency FI, the output frequency PFI, which is calculated right before each frame is started, of output frequencies PFI.

Figure 8:
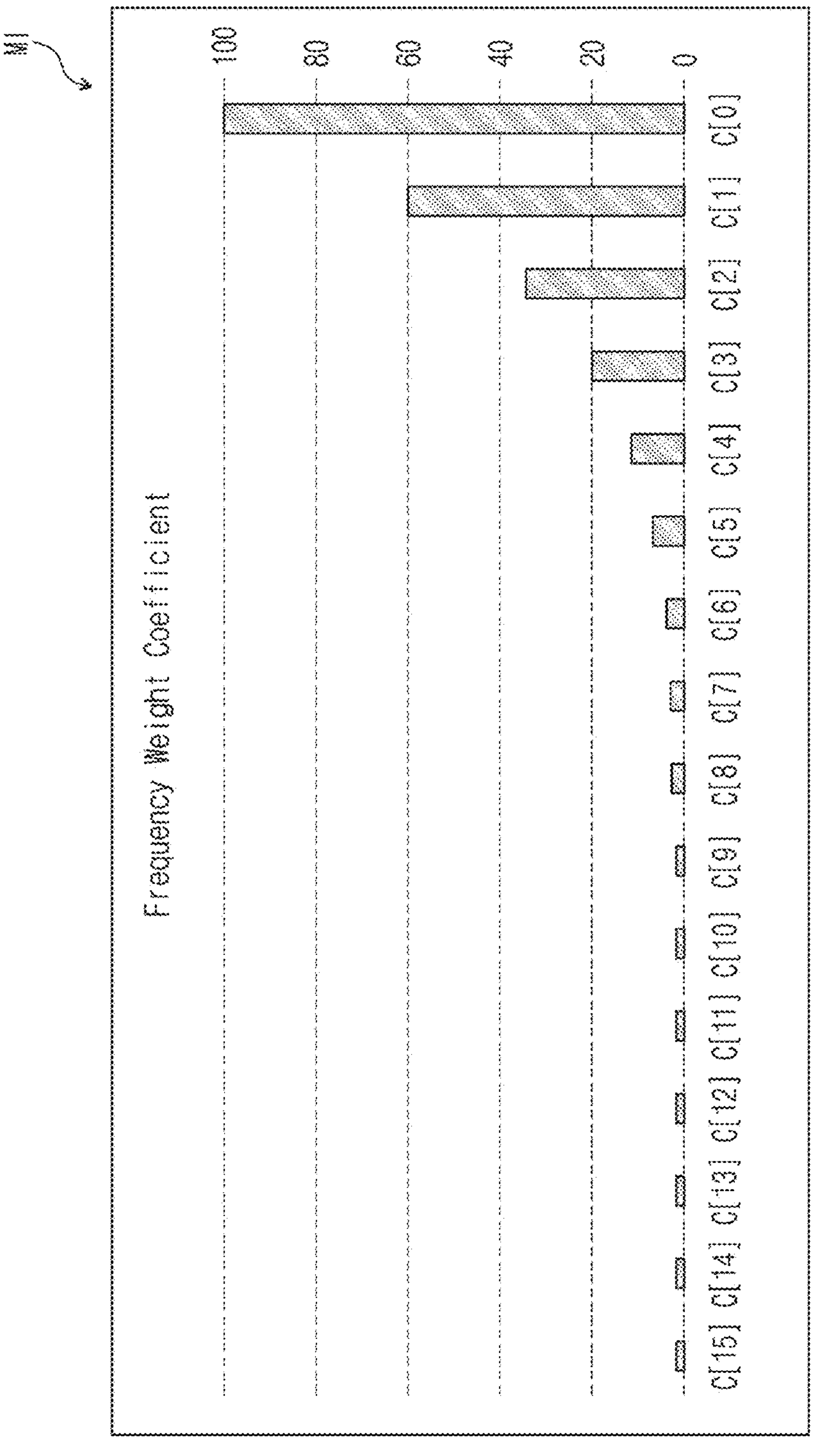
FIG. 8 is a graph illustrating an embodiment of frequency weight coefficients according to the disclosure.

FIG. 7 is a view illustrating an embodiment of an operation of a representative frequency calculator in an embodiment of the disclosure, and FIG. 8 is a graph illustrating an embodiment of frequency weight coefficients according to the disclosure. FIGS. 7 and 8 illustrate that the shift register unit 111 (refer to FIG. 6) includes the first shift register SR0 to the sixteenth shift register SR15. FIG. 7 illustrates first to fourteenth frames FP1 to FP14.

Referring to FIGS. 6 to 8, the synchronization signal Sync may be the vertical synchronization signal Sync. The vertical synchronization signal Sync may be activated at the starting time points of the frames FP1 to FP14, to determine the starting time points of the frames FP1 to FP14. The cycle for activating the vertical synchronization signal Sync may be also varied depending on the frame rates.

The counting signal CYC may be the light-emitting signal EM (refer to FIG. 4A). The counting signal CYC may be repeatedly provided in a predetermined cycle.

The 'W/H' may refer to an input value of the synchronization signal Sync based on the counting signal CYC. The 'W' may refer to that the synchronization signal Sync has a value of '1', and the 'H' may refer to that the synchronization signal Sync has a value of '0'. The values of W/H may be values input to the first shift register SR0.

A count number Cycle_cnt may be also referred to as a value obtained by counting, from '0', the number of times in which the count signal CYC is repeated in one frame. In an embodiment, in the first frame FP1, the count number Cycle_cnt may be '0' or '1', for example. In the tenth frame FP10, the count number Cycle_cnt may be '0', '1', '2', or '3'. In the 14-th frame FP14, the count number Cycle_cnt may be '0', '1', or '2'.

The operating frequency DF may refer to an operating frequency of each of the first to fourteenth frames FP1 to FP14. In an embodiment, the operating frequency DF of each of the first to eighth frames FP1 to FP8 may be about 240 Hz, the operating frequency DF of each of the ninth frame FP9 to the eleventh frame FP11 may be about 120 Hz, and the operating frequency DF of each of the 12-th frame FP12 to the 14-th frames FP14 may be about 160 Hz, for example. In other words, the display panel DP may operate at variable frequencies.

When the synchronization signal Sync and the counting signal CYC are input, the count number Cycle_cnt may be '0', and the value of '1' may be input to the first shift register SR0. Thereafter, when the counting signal CYC is input instead of the synchronization signal Sync, the count number Cycle_cnt becomes 1, and the first shift register SR0 may output an output value of 1 to the second shift register SR1. The received value of 1 may be input to the second shift register SR1. Since the synchronization signal Sync is not input to the first shift register SR0, the value of '0' may be input to the first shift register SR0. The second shift register SR1 may output the stored value to the third shift register SR2.

In other words, when the counting signal CYC is input, the (n−1)-th shift register may output the stored (n−1)-th value to an n-th shift register. In this case, the n-th shift register may output the stored n-th value to an (n+1)-th shift register, and the (n−1)-th value may be stored in the n-th shift register. In this case, 'n' is a natural number greater than 2.

In other words, inputs of the synchronization signal Sync provided in response to the previous counting signal CYC may be stored in the first to sixteenth shift registers SR0 to SR15 by the number of shift registers in shift register units 111. In an embodiment, an input value of a current synchronization signal Sync may be stored in the first shift register SR0, for example. An input value of the synchronization signal Sync of the counting signal CYC before one time may be stored in the second shift register SR1. An input value of the synchronization signal Sync of the counting signal CYC before two times may be stored in the third shift register SR2.

The values of the current and previous synchronization signals Sync may be accumulated and stored in the shift register unit 111

The weight calculator 112 may multiply values stored in the shift register unit 111 by frequency weight coefficients MI, respectively. The values of the frequency weight coefficients MI may be decreased, as the number of the shift register to be multiplied is increased.

The frequency weight coefficients MI may include the first to sixteenth frequency weight coefficients C[0] to C[15]. The values of the frequency weight coefficients MI may be decreased toward the 16-th frequency weight coefficient C[15] from the first frequency weight coefficient C[0]. In an embodiment, the first frequency weight coefficient C[0] may have a value of 100, for example. The second frequency weight coefficient C[1] may have a value of 60. The third frequency weight coefficient C[2] may have a value of 36.

According to the disclosure, the operating frequency DF may be greatly affected by an operating frequency just before the operating frequency DF. The representative frequency calculator 110 may assign a larger frequency weight coefficient C[0] to the operating frequency right before the operating frequency DF. The representative frequency calculator 110 may assign a smaller frequency weight coefficient C[15] to a previous operating frequency which is expired. In addition, the electronic device DD improved in reliability may be provided.

In an embodiment, when the count number Cycle_cnt is 3 in the ninth frame FP9, the value of '0' may be stored in the first shift register SR0, for example. The value of '0' may be stored in the second shift register SR1. The value of '0' may be stored in the third shift register SR2. The value of '1' may be stored in the fourth shift register SR3. The value of '0' may be stored in the fifth shift register SR4. The value of '1' may be stored in the sixth shift register SR5. The value of '0' may be stored in the seventh shift register SR6. The value of '1' may be stored in the eighth shift register SR7. The value of '0' may be stored in the ninth shift register SR8. The value of '1' may be stored in the tenth shift register SR9. The value of '0' may be stored in the eleventh shift register SR10. The value of '1' may be stored in the twelfth shift register SR11. The value of '0' may be stored in the thirteenth shift register SR12. The value of '1' may be stored in the fourteenth shift register SR13. The value of '0' may be stored in the fifteenth shift register SR14. The value of '1' may be stored in the sixteenth shift register SR15.

In this case, the weight multiplier 112 may multiply the value stored in the first shift register SR0 by the first frequency weight coefficient C[0]. The weight multiplier 112 may multiply the value stored in the second shift register SR1 by the second frequency weight coefficient C[1]. The weight multiplier 112 may multiply the value stored in the third shift register SR2 by the third frequency weight coefficient C[2]. The weight multiplier 112 may multiply the value stored in the fourth shift register SR3 by the fourth frequency weight coefficient C[3]. The weight multiplier 112 may multiply the value stored in the fifth shift register SR4 by the fifth frequency weight coefficient C[4]. The weight multiplier 112 may multiply the value stored in the sixth shift register SR5 by the sixth frequency weight coefficient C[5]. The weight multiplier 112 may multiply the value stored in the seventh shift register SR6 by the seventh frequency weight coefficient C[6]. The weight multiplier 112 may multiply the value stored in the eighth shift register SR7 by the eighth frequency weight coefficient C[7]. The weight multiplier 112 may multiply the value stored in the ninth shift register SR8 by the ninth frequency weight coefficient C[8]. The weight multiplier 112 may multiply the value stored in the tenth shift register SR9 by the tenth frequency weight coefficient C[9]. The weight multiplier 112 may multiply the value stored in the eleventh shift register SR10 by the eleventh frequency weight coefficient C[10]. The weight multiplier 112 may multiply the value stored in the twelfth shift register SR11 by the twelfth frequency weight coefficient C[11]. The weight multiplier 112 may multiply the value stored in the thirteenth shift register SR12 by the thirteenth frequency weight coefficient C[12]. The weight multiplier 112 may multiply the value stored in the fourteenth shift register SR13 by the fourteenth frequency weight coefficient C[13]. The weight multiplier 112 may multiply the value stored in the fifteenth shift register SR14 by the fifteenth frequency weight coefficient C[14]. The weight multiplier 112 may multiply the value stored in the sixteenth shift register SR15 by the sixteenth frequency weight coefficient C[15].

The frequency calculator 113 may calculate the output frequency PFI by adding calculation values which are obtained by multiplying the output values of the shift register unit 111 by mutually different weights, respectively. In this case, the output frequency PFI may have the value of 65.

In this case, since the output frequency PFI is a frequency calculated right before the tenth frame FP10 starts, the representative frequency FI of the tenth frame FP10 may be output as a value of '65'.

The electronic device DD (refer to FIG. 1) may be driven at a variable operating frequency, which differs from that of the disclosure. The brightness difference may be made in light emitted from the display panel DP (refer to FIG. 2) due to the change in the operating frequency. However, according to the disclosure, the representative frequency calculator 110 may calculate the representative frequency FI by accumulating previous operating frequencies through the shift register unit 111. The weight calculator 112 may calculate the representative frequency FI by controlling the degree of considering the accumulated operating frequencies using a weight. The drive controller 100 may output a signal for controlling the brightness of light emitted by the display panel DP (refer to FIG. 2) based on the optimally calculated representative frequency FI. In addition, the electronic device DD improved in reliability may be provided.

Figure 9:
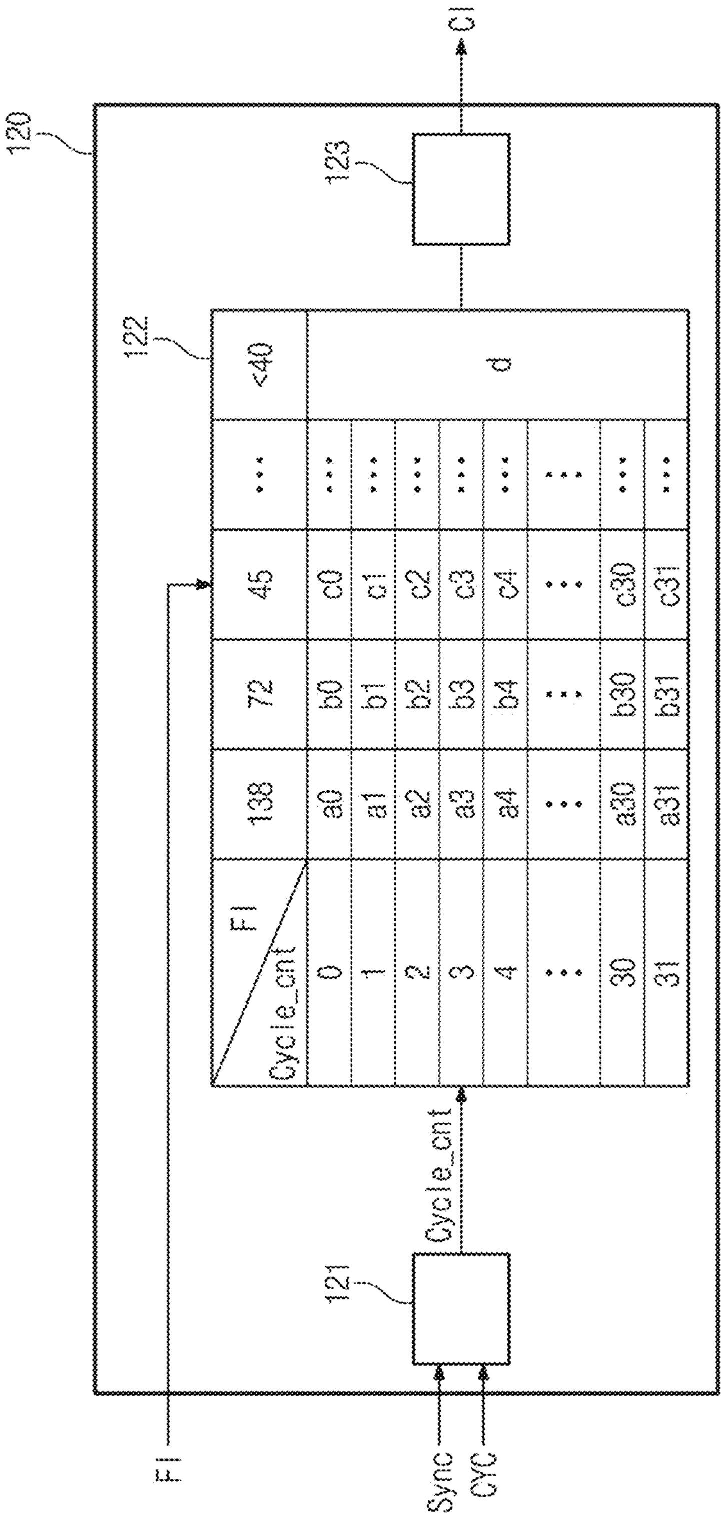
FIG. 9 is a block diagram illustrating an embodiment of a compensating signal calculator according to the disclosure.

FIG. 9 is a block diagram illustrating an embodiment of a compensating signal calculator according to the disclosure.

Referring to FIGS. 6 to 9, the compensating signal calculator 120 may receive the representative frequency FI, the synchronization signal Sync, and the counting signal CYC.

The compensating signal calculator 120 may include a counter 121, a look-up table 122, and an interpolator 123.

The counter 121 may receive the synchronization signal Sync and the counting signal CYC. The counter 121 may output the count number Cycle_cnt, based on the synchronization signal Sync and the counting signal CYC. The count number Cycle_cnt may be also referred to as a value obtained by counting the number of times in which the count signal CYC is repeated in one frame, from '0'. The one frame may be defined based on the synchronization signal Sync. In an embodiment, a time point, at which the synchronization signal Sync has the value of '1', may be defined as a time point at which a frame starts, for example.

The look-up table 122 may be defined for each representative frequency FI and each count number Cycle_cnt. The look-up table 122 may define compensating signal values a0 to d, and the compensating signal calculator 120 may output the compensating signal CI based on the compensating signal values a0 to d.

Although FIG. 9 illustrates that the counting number Cycle_cnt has a value in the range of '0' to '31', the disclosure is not limited thereto.

When the representative frequency FI is greater than or equal to the reference value, the compensating signal values a0 to c31 defined for each count number Cycle_cnt at the representative frequency FI may have at least one different value. In an embodiment, when the representative frequency FI output from the representative frequency calculator 110 has a value of '138', the first compensating signal value a0 when the count number Cycle_cnt is '0' may differ from the 32nd compensating signal value a31 when the count number Cycle_cnt is 31, for example.

In an embodiment, the reference value may be '40'. However, the above value is provided only for the illustrative purpose. The predetermined value in an embodiment of the disclosure is not limited thereto and may be variously provided by a user.

When the representative frequency FI is less than the reference value, the compensating signal value 'd' at the representative frequency FI may have a constant value. In an embodiment, when the representative frequency FI output from the representative frequency calculator 110 has a value of '36', the compensating signal value 'd' may be fixed and output as the compensating signal CI, for example.

The interpolator 123 may calculate the compensating signal CI by utilizing a linear interpolation manner, based on the compensating signal values a0 to d received from the look-up table 122. The linear interpolation manner may be a manner for calculating the compensating signal CI depending on the representative frequency FI, which is disposed between two coordinates including the representative frequency FI and a compensating signal values a0 to d, in the same counting signal CYC. However, the manner is provided only for the illustrative purpose, In an embodiment, the interpolator 123 in an embodiment of the disclosure may select and utilize various manners, for example.

In an embodiment, when the representative frequency FI output from the representative frequency calculator 110 has a value of '65' and when the count number Cycle_cnt is '2', the look-up table 122 may output compensating signal values b2 and c2 having the count number of 2 at '75' and '45' adjacent to '65', for example. The look-up table 122 may output the compensating signal CI through the linear interpolation manner for 'b2' and 'c2'.

According to the disclosure, the representative frequency calculator 110 may output the representative frequency FI by considering a plurality of accumulated operating frequencies. The compensating signal calculator 120 may output the compensating signal CI, based on the representative frequency FI. The look-up table 122 is not provided for all cases of accumulated operating frequencies, but one look-up table may be defined based on the calculated representative frequency FI. In other words, since a look-up table for all cases of accumulated frequencies of the electronic device DD (refer to FIG. 1) may be unnecessary, an additional memory may be unnecessary. Accordingly, an area in which the additional memory is disposed may be unnecessary, and an area of the non-display region NDA (refer to FIG. 1) may be reduced. In addition, power consumption may be reduced by outputting the compensating signal CI using one look-up table 122 and the interpolator 123. Accordingly, the electronic device DD (refer to FIG. 1) improved in reliability may be provided.

Figure 10:
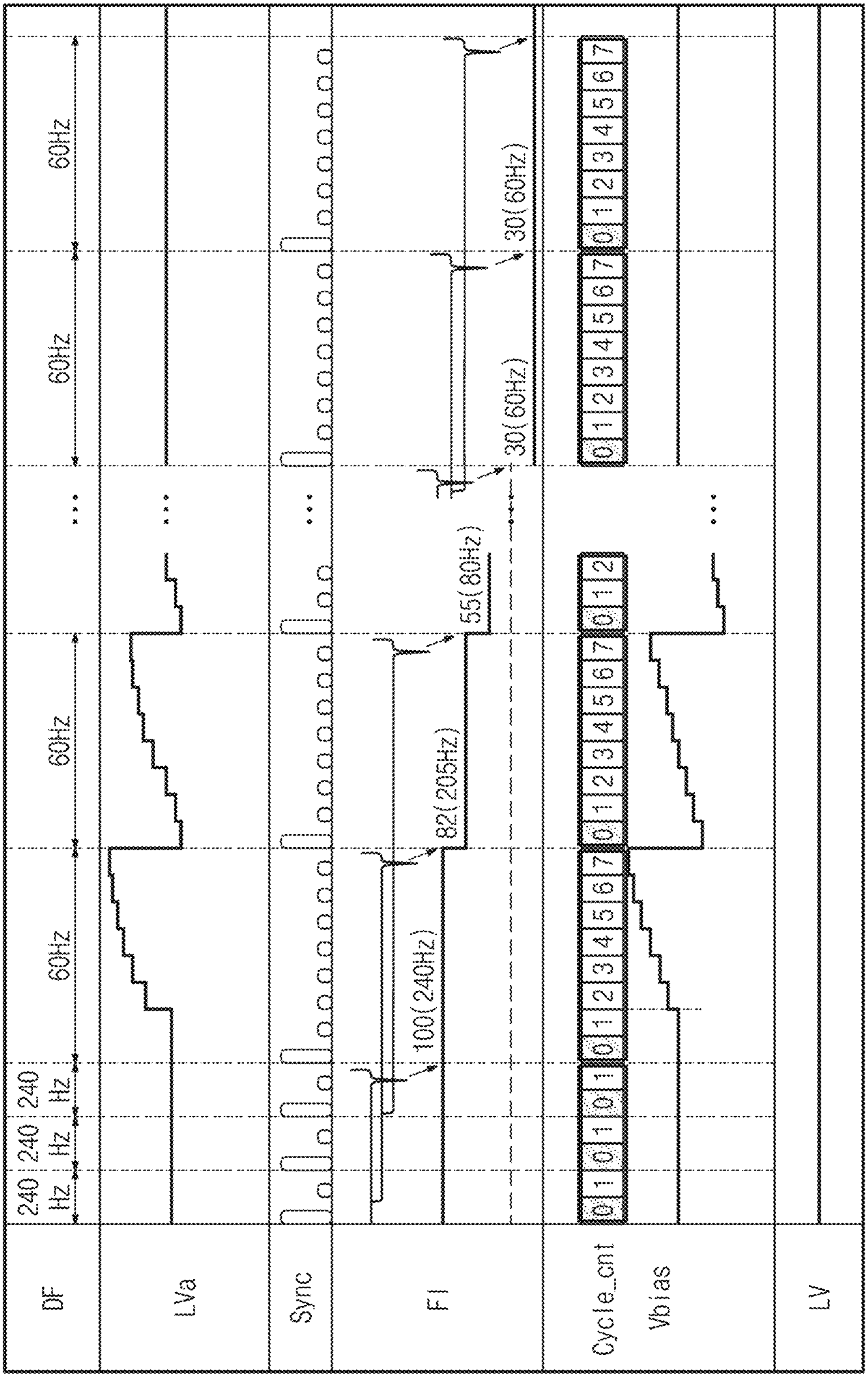
FIG. 10 illustrates an embodiment of a driving process of an electronic device according to the disclosure.

FIG. 10 illustrates an embodiment of a driving process of an electronic device according to the disclosure.

Referring to FIGS. 2, 3, 5, and 10, the representative frequency calculator 110 may output the representative frequency FI, based on operating frequencies DF of 'n' number of frames before one of a plurality of frames. The representative frequency FI may be calculated based on the synchronization signal Sync.

The compensating signal calculator 120 may output the compensating signal CI, based on the representative frequency FI and the count number Cycle_cnt in one frame.

The voltage generator 300 may generate the reference voltage Vbias provided to a first electrode of the first transistor T1. The voltage generator 300 may control the level of the reference voltage Vbias, based on the compensating signal CI.

In an embodiment, as the count number Cycle_cnt is increased, the level of the reference voltage Vbias may be increased, for example. In an embodiment, the representative frequency FI may be 100 in a frame changed from about 240 Hz to about 60 Hz. In this case, the reference voltage Vbias may be 6.00 V when the count number Cycle_cnt is '0', for example. The reference voltage Vbias may be 7.30 V when the count number (Cycle_cnt) is '7'. The brightness of a plurality of pixels PX of the display panel DP may be controlled by the reference voltage Vbias.

According to the disclosure, the representative frequency calculator 110 may output the representative frequency FI by considering the accumulated operating frequencies. The compensating signal calculator 120 may output the optimal compensating signal CI, based on the representative frequency FI. Each of a plurality of pixels PX of the display panel DP may emit light, based on the reference voltage Vbias controlled by the compensating signal CI. The electronic device DD may provide a constant optical waveform LV, regardless of the change in the operating frequency DF. Accordingly, the electronic device DD improved in display quality may be provided.

Unlike the disclosure, when the compensation is not achieved by the representative frequency calculator 110 and the compensating signal calculator 120, the brightness of the optical waveform LVa may be increased when the operating frequency DF changes from a high frequency to a low frequency. When the operating frequency DF is changed, a brightness difference may be made in the optical waveform LVa. In addition, the brightness difference of the optical waveform LVa may be variously made depending on the accumulated operating frequency. In an embodiment, 4.3% of brightness difference may be made when the frame is changed from one frame of about 240 Hz to a frame of about 30 Hz, for example. When the frame is changed to a frame of about 30 Hz after two frames of about 240 Hz, 6.2% of the brightness difference may be made. When the frame is changed to a frame of about 30 Hz after four frames of about 240 Hz, 8.0% of the brightness difference may be made. When the frame is changed to a frame of about 30 Hz after six frames of about 240 Hz, 9.8% of the brightness difference may be made. Accordingly, the flicker phenomenon may be made. However, according to the disclosure, when the operating frequency DF is changed, the representative frequency calculator 110 may calculate the representative frequency FI, and the compensating signal calculator 120 may output the compensating signal CI that compensates the optical waveform LV based on the representative frequency FI. In other words, even when the brightness difference is variously made depending on the accumulated operating frequency, the brightness of the optical waveform LV may be constantly maintained by outputting the compensating signal CI based on the representative frequency FI. In addition, the electronic device DD improved in display quality may be provided.

Figure 11:
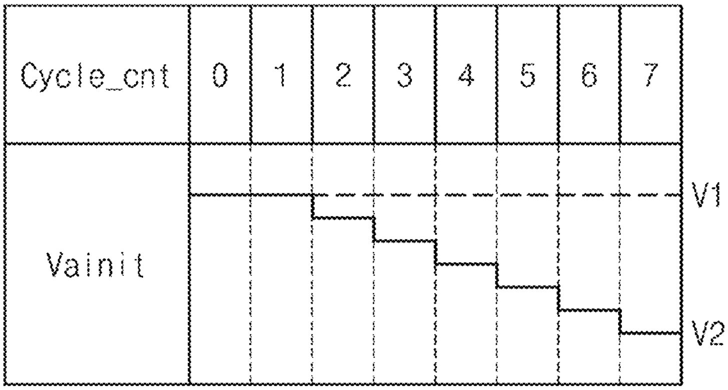
FIG. 11 illustrates an embodiment of driving of a second initialization voltage according to the disclosure.

FIG. 11 illustrates an embodiment of driving of a second initialization voltage according to the disclosure. FIG. 11 illustrates a level of the second initialization voltage Vainit when the frame is changed from the 240 Hz frame to the 60 Hz frame in FIG. 10.

Referring to FIGS. 10 and 11, the voltage generator 300 may generate the second initialization voltage Vainit provided to the second electrode of the fourth transistor T4 (refer to FIG. 3). The voltage generator 300 may control the level of the reference voltage Vbias, based on the compensating signal CI.

When the representative frequency FI is 40 or more, the level of the second initialization voltage Vainit may be decreased, as the count number Cycle_cnt is increased. In an embodiment, when the frame is changed from the frame of about 240 Hz to the frame of about 60 Hz, the second initialization voltage Vainit may have in the first level V1 when the count number Cycle_cnt is '0', and the second initialization voltage Vainit may have in the second level V2 when the count number Cycle_cnt is '7', for example. When the representative frequency FI is 100, the first level V1 may be greater than the second level V2. The brightness of a plurality of pixels PX of the display panel DP may be controlled by the second initialization voltage Vainit.

According to the disclosure, the representative frequency calculator 110 (refer to FIG. 5) may output the representative frequency FI by considering the accumulated operating frequencies. The compensating signal calculator 120 (refer to FIG. 5) may output the optimal compensating signal CI, based on the representative frequency FI. Each of a plurality of pixels PX of the display panel DP (refer to FIG. 2) may emit light, based on the second initialization voltage Vainit controlled by the compensating signal CI. The electronic device DD (refer to FIG. 2) may provide a optical waveform LV, which is constant regardless of the change in the operating frequency DF. In addition, the electronic device DD improved in display quality may be provided.

Figure 12A:
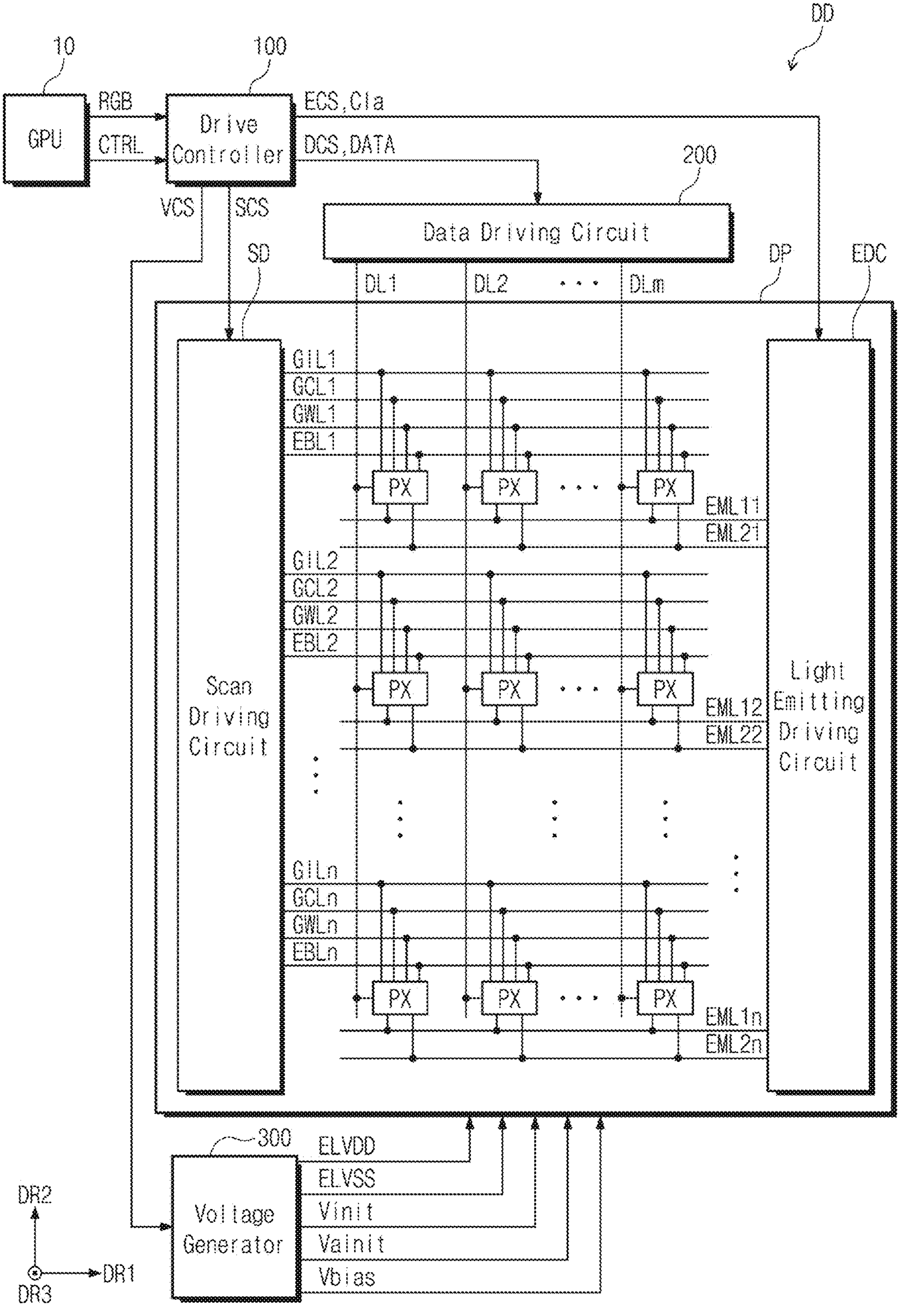
FIG. 12A is a block diagram of an embodiment of an electronic device according to the disclosure.
Figure 12B:
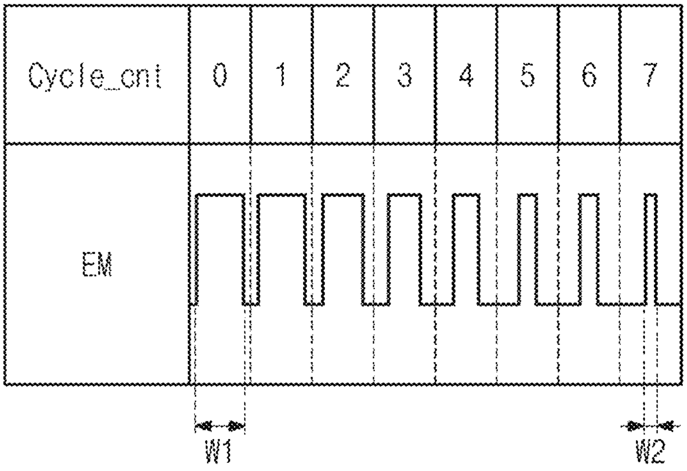
FIG. 12B illustrates an embodiment of a light-emitting signal driven according to the disclosure.

FIG. 12A is a block diagram of an embodiment of an electronic device in an embodiment of the disclosure, and FIG. 12B illustrates an embodiment of a light-emitting signal driven according to the disclosure. In the following description made with reference to FIG. 12A, the same components as the components described with reference to FIG. 2 will be assigned with the same reference numerals, and the details thereof will be omitted to avoid redundancy. FIG. 12B illustrates a level of the light-emitting signal EM when the frame is changed from the frame of about 240 Hz to the frame of about 60 Hz in FIG. 10.

Referring to FIGS. 10, 12A, and 12B, the compensating signal calculator 120 (refer to FIG. 5) may output a compensating signal Cia. The light-emitting driving circuit EDC may receive the light-emitting control signal ECS and the compensating signal CIa from the drive controller 100.

The light-emitting driving circuit EDC may generate the light-emitting signal EM. The light-emitting driving circuit EDC may control a signal width of the light-emitting signal EM provided to the gate electrode of the ninth transistor T9 (refer to FIG. 3), based on the compensating signal CIa. The signal width may refer to a time when the light-emitting signal EM is applied.

When the representative frequency FI is 40 or more, the signal width of the light-emitting signal EM may be decreased, as the count number Cycle_cnt is increased. In an embodiment, when the frame is changed from the frame of about 240 Hz to the frame of about 60 Hz, the light-emitting signal EM may have a first signal width W1 when the count number Cycle_cnt is ‘0’, and the light-emitting signal EM may have a second signal width W2 when the count number Cycle_cnt is ‘7’, for example. When the representative frequency FI is 100, the first signal width W1 may be greater than the second signal width W2. The brightness of a plurality of pixels PX of the display panel DP may be controlled by the signal width of the light-emitting signal EM.

According to the disclosure, the representative frequency calculator 110 (refer to FIG. 5) may output the representative frequency FI by considering the accumulated operating frequencies. The compensating signal calculator 120 (refer to FIG. 5) may output the optimal compensating signal CIa, based on the representative frequency FI. Each of a plurality of pixels PX of the display panel DP (refer to FIG. 2) may emit light, based on the light-emitting signal EM controlled by the compensating signal CIa. The electronic device DD (refer to FIG. 2) may provide a constant optical waveform LV, regardless of the change in the operating frequency DF. In addition, the electronic device DD (refer to FIG. 2) improved in display quality may be provided.

As described above, the representative frequency calculator may output the representative frequency based on accumulated operating frequencies. The compensating signal calculator may output the optimal compensating signal based on the representative frequency. Each of the plurality of pixels of the display panel may emit light based on a voltage controlled by the compensating signal. The electronic device may provide a predetermined light waveform, regardless of the change of the operating frequency. In addition, the electronic device improved in display quality may be provided.

Although an embodiment of the disclosure has been described for illustrative purposes, those skilled in the art will appreciate that various modifications, and substitutions are possible, without departing from the scope and spirit of the invention as disclosed in the accompanying claims. Accordingly, the technical scope of the disclosure is not limited to the detailed description of this specification, but should be defined by the claims.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An electronic device comprising:

a display panel which includes a plurality of pixels and displays an image at each of a plurality of frames;

a driving circuit which drives the plurality of frames at a plurality of operating frequencies;

a voltage generator which provides a voltage to the display panel; and a drive controller which controls driving of the driving circuit, the drive controller including:

a representative frequency calculator which calculates a representative frequency, based on operating frequencies of ‘n’ number of frames before one frame of the plurality of frames, where ‘n’ is an integer greater than 0; and a compensating signal calculator which outputs a compensating signal, based on the representative frequency and a count number in the one frame, wherein the drive controller transmits the compensating signal to the voltage generator, wherein the voltage includes a reference voltage, wherein the voltage generator generates the reference voltage based on the compensating signal, and wherein the voltage generator provides the reference voltage to each of the plurality of pixels.

2. The electronic device of claim 1, wherein the representative frequency is calculated, based on a synchronization signal for starting each of the plurality of frames, and a counting signal for counting the plurality of frames in a predetermined cycle, and wherein the count number is output based on the counting signal.

3. The electronic device of claim 2, wherein the synchronization signal is a vertical synchronization signal.

4. The electronic device of claim 2, wherein the representative frequency calculator includes a plurality of shift registers which receive the synchronization signal and the counting signal, wherein the plurality of shift registers is electrically connected to each other in series, and wherein one shift register of the plurality of shift registers transmits an output value to another shift register connected to the one shift register of the plurality of shift registers, when the one shift register receives the counting signal.

5. The electronic device of claim 4, wherein the representative frequency is calculated by multiplying output values of the plurality of shift registers by mutually different weights.

6. The electronic device of claim 2, wherein the compensating signal calculator includes a look-up table defined based on the representative frequency and the count number.

7. The electronic device of claim 6, wherein a plurality of compensating signals is provided, and wherein the plurality of compensating signals defined based on the count number at the representative frequency have at least one different value, when the representative frequency exceeds a predetermined value.

8. The electronic device of claim 7, wherein the compensating signal has a preset value, when the representative frequency is equal to or less than the predetermined value.

9. The electronic device of claim 2, wherein each of the plurality of pixels includes:

a first capacitor connected between a first node and a second node;

a second capacitor connected between a first voltage line for providing a first driving voltage and the first node;

a light-emitting diode including a first electrode and a second electrode connected to a second voltage line for providing a second driving voltage different from the first driving voltage;

a first transistor including a first electrode electrically connected to the first voltage line, a second electrode electrically connected to the first electrode of the light-emitting diode, and a gate electrode connected to the second node; and a second transistor including a first electrode connected to a data line, a second electrode electrically connected to the first node, and a gate electrode which receives a scan signal.

10. The electronic device of claim 9, wherein the reference voltage is provided to the first electrode of the first transistor.

11. The electronic device of claim 9, wherein the voltage includes an initialization voltage, wherein the voltage generator generates the initialization voltage based on the compensating signal, and wherein the initialization voltage is provided to the first electrode of the light-emitting diode.

12. The electronic device of claim 9, wherein a third transistor including a first electrode connected to the first voltage line, a second electrode electrically connected to the first electrode of the first transistor, and a gate electrode which receives a light-emitting signal.

13. The electronic device of claim 12, wherein the counting signal is defined based on the light-emitting signal.

14. The electronic device of claim 12, wherein the synchronization signal is defined based on the scan signal.

15. An electronic device comprising:

a display panel including a plurality of pixels which display an image at each of a plurality of frames;

a driving circuit which drives the plurality of frames at a plurality of operating frequencies; and a drive controller which controls driving of the driving circuit, the drive controller including:

a representative frequency calculator which calculates a representative frequency, based on at least one operating frequency of at least one frame before one frame of the plurality of frames; and a compensating signal calculator which outputs a compensating signal, based on the representative frequency and an operating frequency in the at least one frame, wherein the drive controller transmits the compensating signal to the driving circuit, wherein the driving circuit generates a light-emitting signal based on the compensating signal, and wherein the driving circuit provides the light-emitting signal to each of the plurality of pixels.

16. The electronic device of claim 15, wherein the representative frequency is calculated, based on a synchronization signal for starting each of the plurality of frames, and a counting signal for counting a cycle of each of the plurality of frames.

17. The electronic device of claim 16, wherein the representative frequency calculator includes:

a plurality of shift registers which receive the synchronization signal and the counting signal, wherein the plurality of shift registers is electrically connected to each other in series, and wherein one shift register of the plurality of shift registers transmits an output value to another shift register connected to the one shift register of the plurality of shift registers, when the one shift register receives the counting signal.

18. The electronic device of claim 17, wherein the representative frequency is calculated by multiplying output values of the plurality of shift registers by mutually different weights from each other.

19. The electronic device of claim 17, wherein the compensating signal calculator includes:

a look-up table defined based on the representative frequency and a count number in the one frame.

20. A drive controller for a display panel comprising:

a representative frequency calculator; and a compensating signal calculator, wherein the drive controller receives an image signal provided at each of a plurality of frames driven at an operating frequency, wherein the representative frequency calculator outputs a representative frequency based on operating frequencies of 'n' number of frames before one frame of the plurality of frames, wherein 'n' is an integer greater than 0, wherein the compensating signal calculator outputs a compensating signal, based on the representative frequency and a count number in the one frame, and wherein each of the plurality of pixels of the display panel emit light based on a voltage controlled by the compensating signal regardless of a change of the operating frequency.

* * * * *